(12) United States Patent
Roy et al.

(10) Patent No.: US 6,243,359 B1
(45) Date of Patent: Jun. 5, 2001

(54) METHODS AND APPARATUS FOR MANAGING TRAFFIC IN AN ATM NETWORK

(75) Inventors: Subhash C. Roy, Stamford; William B. Lipp, New Haven; Daniel C. Upp, Southbury, all of CT (US); Alberto Bricca, Morena (IT)

(73) Assignee: TranSwitch Corp, Shelton, CT (US)

( * ) Notice: Subject to any disclaimer, the term of this patent is extended or adjusted under 35 U.S.C. 154(b) by 0 days.

(21) Appl. No.: 09/302,200

(22) Filed: Apr. 29, 1999

(51) Int. Cl.[7] .................................................. H04J 3/02
(52) U.S. Cl. ........................ 370/230; 370/235; 370/412; 370/429
(58) Field of Search .................................. 370/229, 230, 370/232, 235, 236, 252, 395, 398, 412, 413, 414, 416, 429, 231, 415

(56) References Cited

U.S. PATENT DOCUMENTS

| 5,313,454 | * | 5/1994 | Bustini et al. | 370/236 |
| 5,850,395 | * | 12/1998 | Hauser et al. | 370/398 |
| 5,936,958 | * | 8/1999 | Soumiya et al. | 370/395 |
| 5,953,318 | * | 9/1999 | Nattkemper et al. | 370/236 |

* cited by examiner

Primary Examiner—Douglas Olms
Assistant Examiner—Shick Hom
(74) Attorney, Agent, or Firm—David P. Gordon; David S. Jacobson; Thomas A. Gallagher (57) ABSTRACT

The apparatus includes a separate line side inlet queue for each GFR VC, a single network side outlet queue for all GFR VCs, a single network side inlet queue for all GFR VCs, a single line side outlet bulk processing queue with a post queue packet processor followed by separate line side outlet queues for each line, a network side outlet queue monitor, and a line side inlet queue controller. The network side outlet queue monitor is coupled to the line side inlet queue controller so that the network side outlet queue monitor can send messages to the line side inlet queue controller. According to one of the methods of the invention, the network side outlet queue monitor sends messages to the line side inlet queue controller directing the line side inlet queue controller to send data from the line side GFR queues based on the status of the network side outlet GFR queue. According to another method of the invention, the line to side inlet queue controller discards packets for a GFR VC if congestion is indicated. According to still another method of the invention, the post queue packet processor discards packets above the PCR if the size of the line side outlet bulk processing queue exceeds a threshold size and discards packets above the MCR if discarding packets above the PCR fails to sufficiently reduce the size of the line side outlet bulk processing queue.

18 Claims, 5 Drawing Sheets

METHODS AND APPARATUS FOR MANAGING TRAFFIC IN AN ATM NETWORK

BACKGROUND OF THE INVENTION

1. Field of the Invention

The invention relates to the allocation of bandwidth in an ATM (Asynchronous Transfer Mode) network. More particularly, the invention relates to methods and apparatus for controlling traffic and congestion via queuing structures.

2. State of the Art

A properly constructed ATM network must manage traffic fairly and provide effective allocation of the network capacity for different types of traffic such as voice, video, and data. The ATM network must also provide cost effective operations relative to the quality of service (QOS) level specified by each network user and must be able to support different delay requirements for different applications. Most importantly, the network must be able to adapt to unforseen traffic patterns, in particular unforseen bursts of traffic from various network users, i.e. network congestion.

The only way to manage network congestion, short of increasing the bandwidth of the network, is to manage the network traffic. According to various ATM standards, traffic management is largely based on QOS levels negotiated between the network operator and the network users. In general, QOS levels specify the maximum amount of traffic which each user may submit to the network in a measured period of time, i.e. a bit rate. A digital voice connection requires no more than about 32 kbits/s whereas a high definition television signal may require more than 6 Mbit/s. These predicted requirements in bandwidth are sometimes referred to as the "natural bit rate" for an application. The natural bit rate required by non-specific data transmissions may vary widely over time from as low as a few kbits/s to as high as several hundred kbits/s. This type of variable natural bit rate is said to be "bursty". The challenge to the ATM network is to support the natural bit rate of all the applications being serviced. Due to statistical bursts, it is inefficient to simply allocate bandwidth for the maximum bit rate required by the application. Because of variable traffic profiles, it may be necessary to discard traffic from certain users when the network experiences congestion.

As suggested above, congestion refers to a condition that exists at the ATM layer in the network elements such as switches, transmission links, or cross-connects where the network is not able to meet a stated and negotiated performance objective (the QOS levels specified by the network users). Traffic control, on the other hand, refers to a set of actions which are taken by the network to avoid congestion. Thus, "congestion control" is the result of QOS planning and "traffic control".

The actions which may be taken by the network to control traffic are limited by the QOS levels negotiated with the network users. In the ATM network, traffic control includes five types of actions: (1) Connection Admission Control (CAC) to determine at the time of call setup whether a user connection will be accepted or rejected; (2) Usage Parameter Control (UPC) to monitor and regulate traffic at the User Network Interface (UNI); (3) Cell Loss Priority (CLP) control to establish priorities for different types of traffic; (4) traffic shaping mechanisms to alter the nature of traffic at the UNI based on the three previously stated controls; and (5) traffic discarded based on specified policies using information from actions (1) through (4) above.

Figure 1:
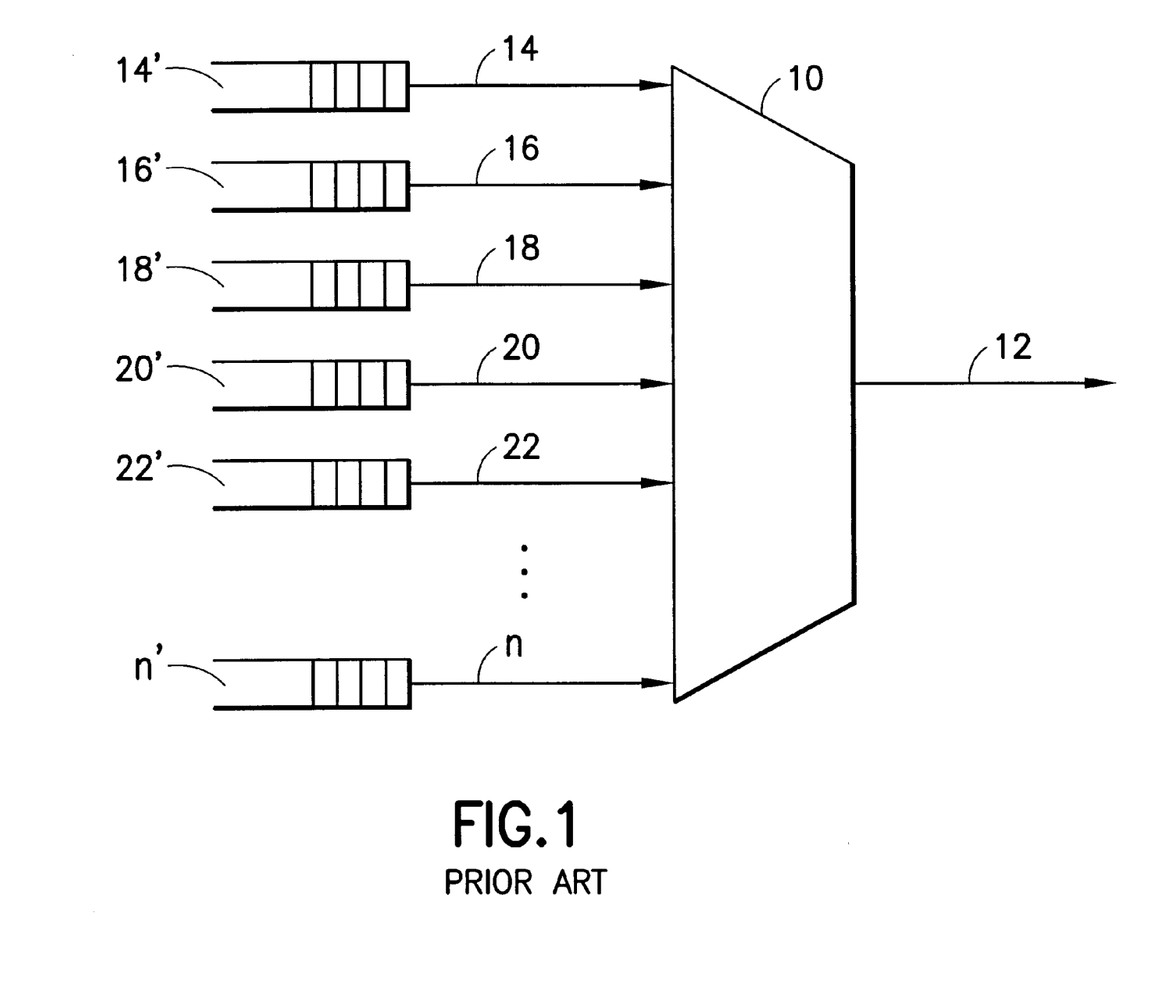
FIG. 1 is a schematic diagram of a prior art multiplexer having a plurality of inlet queues.

A core mechanism utilized in the ATM network is the establishment of queues at the inlet to an ATM node. Prior art FIG. 1 illustrates the simple concept of queues for different types of traffic entering a multiplexer 10 having an outlet 12 with a maximum bandwidth of, e.g., 155 mbits/s. The multiplexer has a number of inlets shown as 14, 16, 18, 20, 22, . . . , n, and each is provided with a corresponding queue (FIFO buffer) 14', 16', 18', 20', 22', . . , n'. Regardless of the bandwidth of the network, the aggregate bit rate of all of the inlets n must not exceed the bandwidth of the outlet 12 for more than a short period of time (e.g. a few milliseconds) during which the queues may prevent data loss. According to the ATM standard, each inlet queue must be serviced in a fair and equitable manner. Queue servicing operations should result in appropriate delays and acceptable data loss for each application. For example, if the queue for inlet 14 in FIG. 1 receives a constant bit rate (CBR) video signal (50–100 kbits/s), it must be serviced every 1–2 milliseconds in order to prevent data loss. On the other hand, if inlet 18 services variable bit rate voice, it may tolerate a data loss of between 1–10% of the samples and the queue for this inlet may be serviced less frequently. The highest priority queue may be the one servicing the signalling channel which contains information for managing the network, including traffic shaping controls to prevent congestion. Other data channels may receive different priority handling depending on the agreed QOS for these channels. The lowest priority queues are those carrying data which is not sensitive to delay, e.g. email.

Those skilled in the art will appreciate that the number of queues and the type of traffic being handled at any node such as the multiplexer 10 in FIG. 1 changes over time and that the node must constantly monitor the state of queues, opening new queues, closing old queues, and assuring that all queues are timely serviced. According to general principles, after the signalling channel is serviced, delay-sensitive queues are serviced for $T_1$ ms or until the delay-sensitive queues are empty if before $T_1$ ms. Next, the delay-insensitive queues are serviced for $T_2$ ms or until they are empty if before $T_2$ ms. If during the servicing times $T_1$ and $T_2$, the signalling channel queue needs to be serviced, the servicing of the queues is suspended and resumed when servicing of the signalling channel queue is completed.

There are three well known equations used to compute the parameters for servicing queues. The first equation, listed as Equation 1 below, assures that for each $q_i$, a fraction $f_i$ of the output link bandwidth is available where $T_i$ is the time parameter for servicing queue $q_i$.

$$f_i = \frac{T_i}{\sum_{i=0}^{n} T_i}, \quad 0 \leq i \leq n \qquad (1)$$

The second equation, listed below as Equation 2, assures that all of the bandwidth assigned to all of the queues does not exceed a fraction of $(1-f_0)$ for the output link capacity.

$$\sum_{i=0}^{n} f_i \leq 1 - f_0 \qquad (2)$$

The third equation, listed below as Equation 3, shows that the cycle time for all queues should be from 1–2 milliseconds in order to guarantee consistent service to delay sensitive traffic.

$$\sum_{i=0}^{n} T_i \le D_c \text{ ms} = M_c t, \quad (D_c \approx 1 \text{ to } 2 \text{ ms}) \tag{3}$$

In Equation 3, $M_c$ is the number of cells withdrawn from the queue during the service cycle time and t is the cell transmission time on the link.

Those skilled in the art will appreciate that one of the most difficult aspects of traffic management are related to variable delays in traffic. Traffic management operations must occur at the source UNI and at the destination UNI in order to account for traffic delays. In other words, data flowing from the network to the UNI must be buffered and data flowing from the users to the network must be buffered. Further, at each device through which data passes from a source to a destination, data must be buffered at the inlet and the outlet of the device. The nature of the traffic will determine how it is buffered and whether or not data is discarded in order to avoid congestion.

Figure 2:
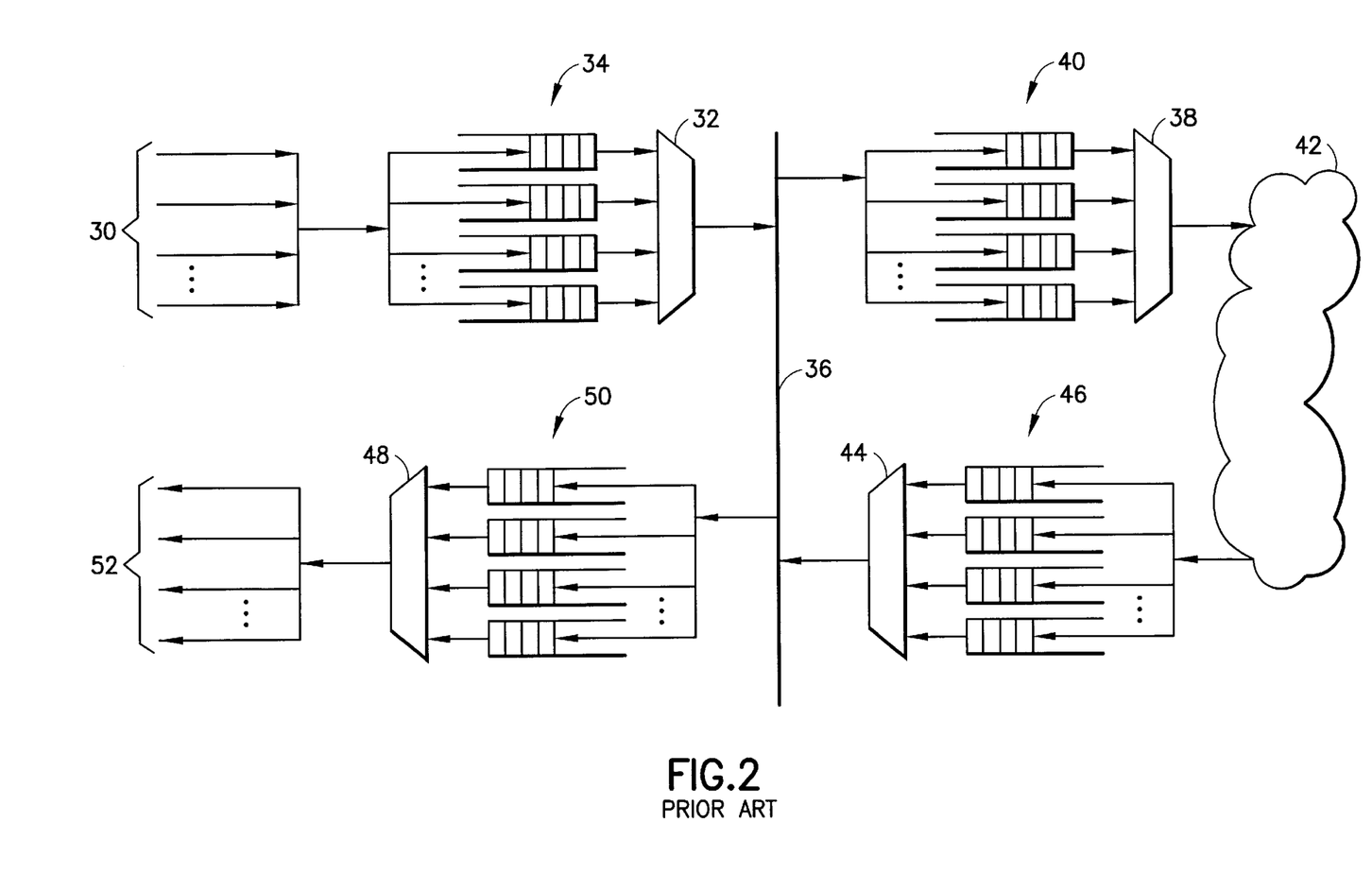
FIG. 2 is a schematic diagram of a prior art UNI ATM device having inlet and outlet queues at both the network side and the line side.

Prior art FIG. 2 illustrates the inlet and outlet buffers in a state of the art ATM device at a UNI. As shown in FIG. 2, a plurality of xDSL line inlets 30 enter a user side inlet multiplexer 32 via a plurality of user inlet queues 34 in a manner similar to that discussed above with reference to FIG. 1. The multiplexer 32 services the queues 34 according to priority as described above and places data on a local bus or switch fabric 36 from which the data enters a network side outlet multiplexer 38 via a plurality of network outlet queues 40. The multiplexer 38 services the queues 40 according to priority and delivers data to the network 42. Data from the network 42 enters a network side inlet multiplexer 44 via a plurality of network inlet queues 46. The multiplexer 44 services the queues 46 according to priority and delivers data to the internal bus or switch fabric 36 from where the data enters a user side outlet multiplexer 48 via a plurality of user outlet queues 50. The multiplexer 48 services the queues 50 and delivers data to a plurality of xDSL line outlets 52.

As mentioned above, queues are generally serviced according to timing parameters and delayed data may need to be discarded. For example, data entering one of the queues 46 from the network 42 may be discarded if buffering would serve no purpose. Thus, if one segment of a data packet is discarded, the remainder of the data packet should be discarded since it must be retransmitted anyway due to end to end flow control.

Ironically, one of the most difficult aspects of implementing traffic control is the fair allocation of available bandwidth during times of light traffic where extra bandwidth is available for distribution among users who have contracted for services such as ABR (available bit rate), UBR (unspecified bit rate), and GFR (guaranteed frame rate). In these services, users pay for a minimum cell rate or minimum frame rate which is an average rate taken over time during which there may be bursty periods and periods of latency. During bursty periods data may be discarded if traffic on the network is heavy. If traffic on the network is light, the extra available bandwidth must be apportioned to these users in a fair way. Presently, there are several different ways to apportion extra bandwidth. One way is referred to as "proportional fairness". According to proportional fairness, each user is assigned a portion of the extra bandwidth in proportion to the minimum rate for which the user contracted. Another way to apportion extra bandwidth is known as "equal fairness". According to equal fairness, each user is apportioned an equal share of the available extra bandwidth regardless of the minimum rate for which the user contracted. A third way to apportion extra bandwidth is known as "weighted fairness". According to weighted fairness, each user is apportioned a weighted share of available extra bandwidth based on one or more factors other than the minimum rate for which the user contracted.

Current implementations of proportional and equal fairness algorithms rely on statistical databases and tend to be inaccurate.

SUMMARY OF THE INVENTION

It is therefore an object of the invention to provide methods and apparatus for managing traffic in an ATM network.

It is also an object of the invention to provide methods and apparatus for queuing ATM cells in an ATM switch.

It is another object of the invention to provide methods and apparatus for allocating available bandwidth according to fairness mechanisms.

It is still another object of the invention to provide to provide methods and apparatus for allocating available bandwidth according to both proportional fairness and equal fairness.

In accord with these objects which will be discussed in detail below, the apparatus of the present invention includes a separate line side (i.e. the side connected to subscriber devices) inlet queue for each GFR VC (virtual connection), a single network side (i.e. the side connected to the core network) outlet queue for all GFR VCs, a single network side inlet queue for all GFR VCs, a single line side outlet bulk processing queue with a post queue packet processor followed by separate line side outlet queues for each line, a network side outlet queue monitor, and a line side inlet queue controller. The network side outlet queue monitor is coupled to the line side inlet queue controller so that the network side outlet queue monitor can send control messages to the line side inlet queue controller. According to one of the methods of the invention, the network side outlet queue monitor sends messages to the line side inlet queue controller directing the line side inlet queue controller to send data from the line side GFR queues based on the status of the network side outlet GFR queue. According to another method of the invention, the line side inlet queue controller discards packets for a GFR VC if congestion is indicated. According to a preferred embodiment, congestion is indicated in one of four ways: (a) the PCR (peak cell rate) is exceeded for any one of the queues, (b) a threshold size of any one of the queues is exceeded, (c) the service class threshold (the threshold set for all of the queues as a group) is exceeded, or (d) the queue memory is full. According to still another method of the invention, the post queue packet processor discards packets above the PCR if the size of the line side outlet bulk processing queue exceeds a threshold size and discards packets above the MCR if discarding packets above the PCR fails to sufficiently reduce the size of the line side outlet bulk processing queue.

According to the presently preferred embodiments the apparatus of the invention is incorporated in a device which handles various types of ATM traffic with network side inlet and outlet buffers and line side inlet and outlet buffers. The preferred apparatus couples the network side buffers and the line side buffers via a bus system as disclosed in co-owned allowed application Ser. No. 08/960,499, now U.S. Pat. No. 5,901,146. Preferably, the network side outlet queue monitor sends messages to the line side inlet queue controllers) via the same common bus system. According to the presently preferred method, a PCR, MCR and M (minimum number of cells) value is assigned to each GFR VC at the time each GFR VC is set up. Queue thresholds for each of the queues and a service class threshold for each group of queues serving a particular service class are als set up at the time queues are established. In addition, a system time parameter T is defined whereby the network outlet side queue controller sends messages (SENDUBR_MCR) messages (SENDUBR_MCR) to the line inlet side queue controller according to the time parameter T directing the line inlet side queue controller to send GFR cells at the MCR for each GFR VC. The number of cells sent from each inlet queue is equal to the MCR of the VC times the parameter T. If the number of cells received at the network side outlet queue is less than the sum of T*MCR for the aggregate of all the GFR VCs, one of two actions is taken depending on the type of fairness implemented. In the case of proportional fairness, the frequency of the (SENDUBR_MCR) messages sent by the network outlet side queue monitor to the line side inlet queue controller is increased by an increment to as high as possible without overflowing the network side outlet queue. The line side inlet queues are also monitored to be sure that PCR is not exceeded for any of the queues. In the case of equal fairness, when the number of cells received at the network side outlet queue is less than the sum of T*MCR for each GFR, the network side outlet queue monitor sends a message (SENDUBR_M) to the line side inlet queue controller to send a specific M number of GFR cells for each GFR VC. The value of M and the frequency of the SENDUBR_M messages are designed to keep the network side outlet queue from underflowing.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 3:
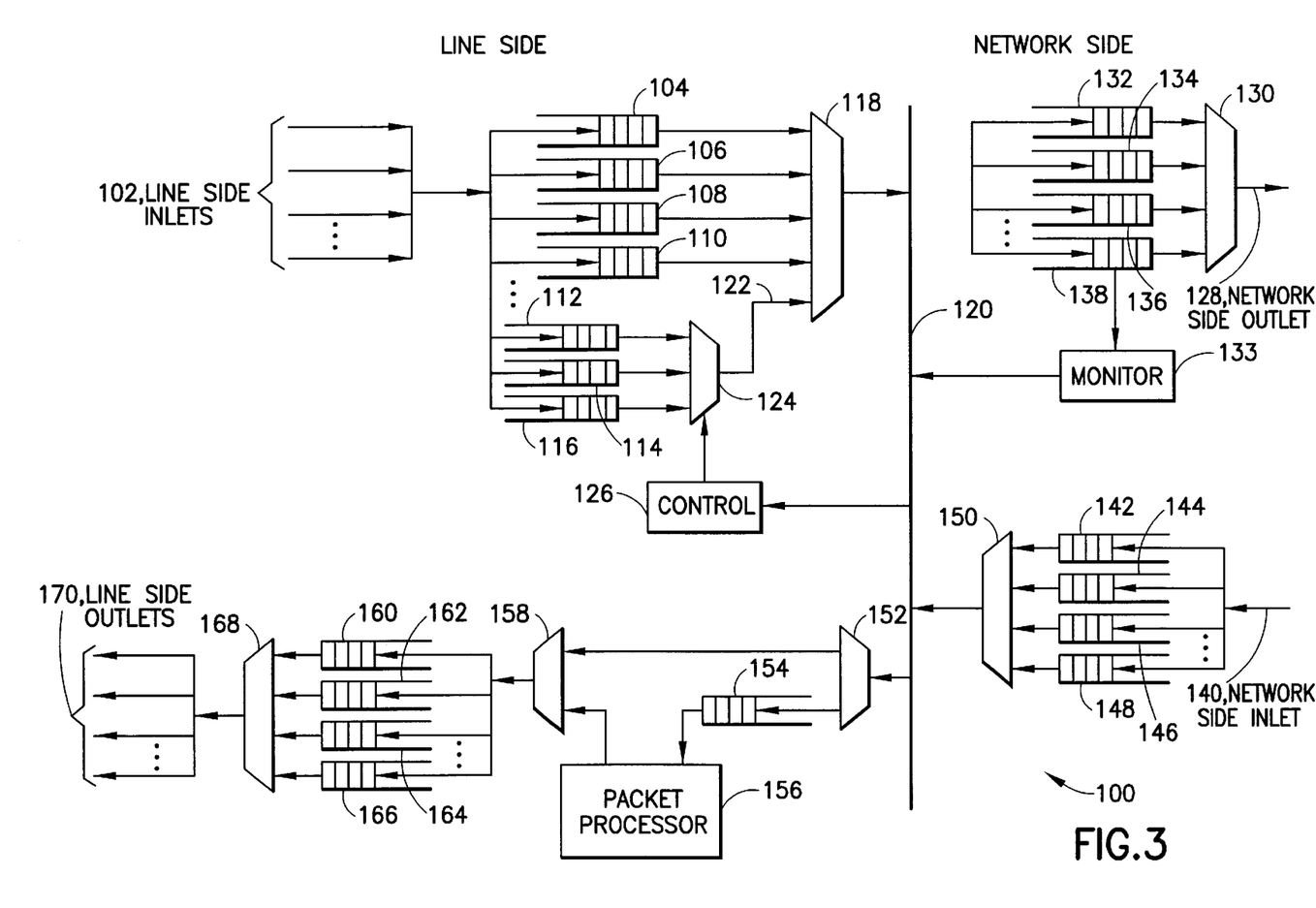
FIG. 3 is a schematic diagram of a UNI ATM device according to the invention.

Referring now to FIG. 3, the apparatus 100 for managing traffic in an ATM network may be implemented in either hardware or software, or a combination of hardware and software. Generally, the apparatus includes a plurality of line side inlets 102, typically xDSL line inlets. According to the presently preferred embodiment, the apparatus 100 has sixteen xDSL line inlets 102. A separate line side inlet queue, e.g., 104, 106, 108, 110 is set up for each class of service other than GFR. A separate line side inlet queue, e.g. 112, 114, 116, is set up for each GFR VC through the apparatus 100. As illustrated for example, queue 104 services all CBR VCs and signalling channels, queue 106 services all VBR-rt VCs, queue 108 services all VBR-nrt VCs, and queues 112, 114, 116 service individual GFR VCs. The outlets of the queues 104, 106, 108, 110 enter a multiplexer 118 which places cells from these queues onto the bus 120 according to conventional priority rules. According to the invention, the outlets of all of the queues servicing GFR VCs are first multiplexed by multiplexer 124 into a single outlet 122 which enters multiplexer 118. The multiplexer 124 is controlled by a line side inlet queue controller 126 which receives commands from the bus 120 as described in more detail below.

The apparatus 100 also generally includes a network side outlet 128 which provides ATM cells from a network side outlet multiplexer 130 to the ATM network (not shown). The network side outlet multiplexer 130 receives input from a plurality of network side outlet queues, for example queues 132, 134, 136, 138. According to the invention, a single network side outlet queue is established for each class of service. As shown for example, the queue 138 services all of the GFR VCs through the apparatus 100. Each of the queues 132, 134, 136, 138 receives ATM cells from the bus 120 and passes the cells to the multiplexer 130. The status of the network side outlet queue 138 for GFR VCs is monitored by a to network side outlet queue monitor 133 which is coupled to the queue 138 and to the bus 120.

A network side inlet 140 receives ATM cells from the network (not shown) and directs the cells to network side inlet queues 142, 144, 146, 148. According to the invention, one network side inlet queue is established for each class of traffic through the device 100. The outlets of the network side inlet queues are multiplexed by multiplexer 150 which is coupled to the bus 120.

According to the invention, ATM cells entering the apparatus 100 from the network are placed on the bus 120 by the multiplexer 150 and are taken from the bus by a demultiplexer 152 which separates GFR cells from all other traffic. The GFR cells are placed in a single queue 154 by the demultiplexer 152. The outlet of queue 154 is coupled to a post queue packet processor 156 which discards cells according to a policy described below. GFR cells which are not discarded by the processor 156 are rejoined by multiplexer 158 with the rest of the cells that were taken from the bus 120 by the demultiplexer 152. The output of the multiplexer 158 is coupled to a plurality of line side outlet queues, e.g. 160, 162, 164, 166, one for each line coupled to the line side of the apparatus 100. The outlets of the line side outlet queues are directed to individual lines, e.g. xDSL lines 170 by, e.g., UTOPIA interface 168.

Figure 4:
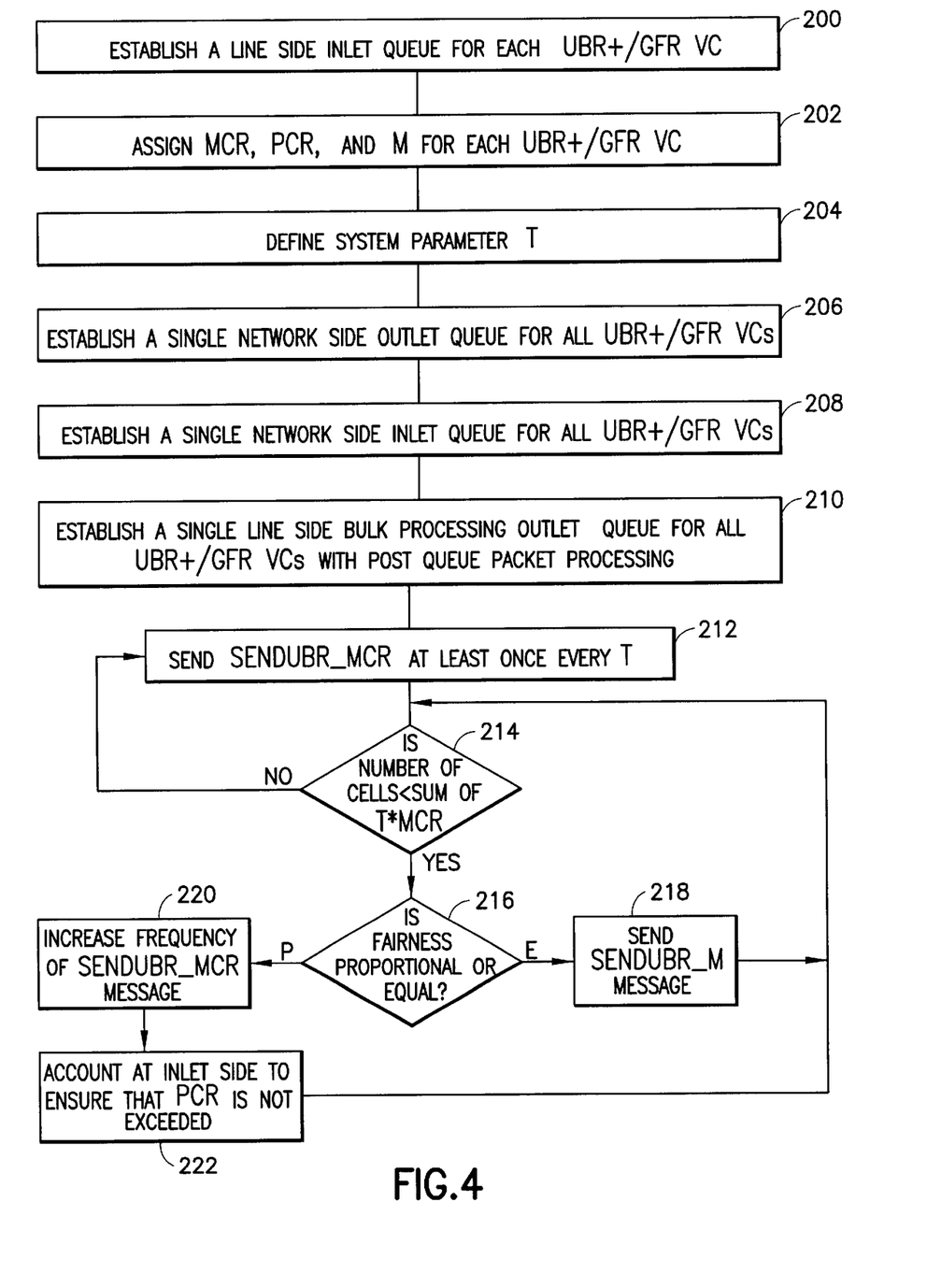
FIG. 4 is a simplified flow chart illustrating the implementation of fair allocation of bandwidth according to the by invention.

According to the methods of the invention, the apparatus 100 operates as described with reference to FIGS. 4–6. Turning now to FIG. 4, and as mentioned above, a separate line side inlet queue is established at 200 for each GFR VC (these are the queues 112, 114, 116 shown in FIG. 3). In addition, an MCR, PCR, and M value is assigned at 202 for each GFR VC. At 204 the definition of system parameter T is shown, though this parameter may be defined at an earlier stage such as upon booting the system. At 206, a single network side outlet queue is established for all GFR traffic (this is the queue 138 shown in FIG. 3). At 208 the single network side inlet queue (148 in FIG. 3) is established; and the line side outlet bulk processing queue (154 in FIG. 3) is established at 210. As mentioned above, the network side outlet queue for GFR traffic is monitored and messages are sent to the controller of the line side inlet queues for each GFR VC. Generally, the line side inlet queue controller is directed to send the MCR for each GFR VC every T milliseconds. This is accomplished by the network side outlet queue monitor (133 in FIG. 3) sending the message SENDUBR_MCR every T milliseconds as indicated at 212 in FIG. 4. The network side outlet queue monitor also monitors the number of cells in the network side outlet queue for GFR traffic and determines at 214 in FIG. 4 whether the number of cells in the queue is less that the sum of the products T*MCR for each GFR VC. The running sum of T*MCR, per VC, is fractionally accounted to prevent rounding losses. If the number of cells drops below this threshold, one of two procedures is followed depending on whether proportional or equal fairness is to be used in allocating bandwidth to the GFR VCs.

If it is determined at 216 in FIG. 4 that equal fairness is to be applied, the network side outlet queue monitor (133 in FIG. 3) sends the message SENDUBR_M to the line side inlet queue controller (126 in FIG. 3) at 218 in FIG. 4. This message directs the controller to send M number of cells for each GFR VC. If the number of cells in the network side outlet queue for GFR traffic remains below the threshold as determined at 214, the SENDUBR_M message is repeated until it is determined at 214 that the number of cells in the network side outlet queue for GFR traffic is at or above the threshold.

If it is determined at 216 that proportional fairness is to be applied, the network side outlet queue monitor increases the frequency of the SENDUBR_MCR messages at 220 and the line side inlet queue controller accounts at 222 to insure that the PCR is not exceeded for any of the GFR VCs. This accounting for PCR violation is accomplished within the cell discard policy illustrated in FIG. 5 and described below. As shown in FIG. 4, when applying proportional fairness, the frequency of the SENDUBR_MCR messages will continue to be increased until it is determined at 214 that the number of cells in the network side outlet queue for GFR traffic is at or above the threshold.

Figure 5:
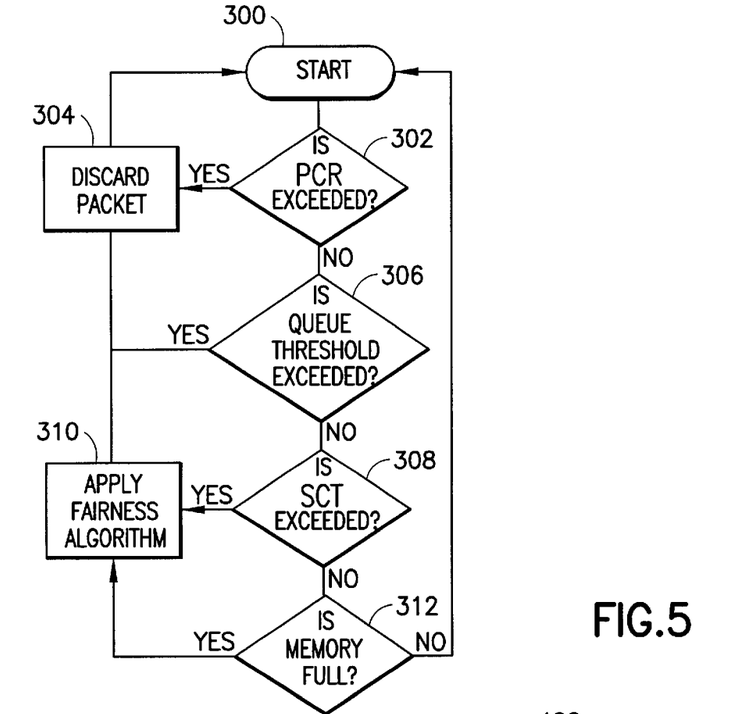
FIG. 5 is a simplified flow chart illustrating the packet discard policy of the line side inlet queue controller according to the invention.

Turning now to FIG. 5, starting at 300, the line side inlet queue controller (126 in FIG. 3) discards cells from the GFR VC queues according to four conditions which indicate congestion. At 302, the controller determines whether the PCR for any one of the queues is exceeded and at 304 discards one or more cells from the affected queue. At 306 the controller determines for each queue whether a threshold size (number of cells in the queue) is exceeded for the queue. If the queue threshold is exceeded, cells from the affected queue are discarded at 304. At 308, the controller determines for all of the queues collectively whether a service class threshold size (total number of cells in all of the queues) is exceeded. If this is the case, cells are discarded at 304, after optionally applying a fairness algorithm at 310 to determine how many cells are discarded from each queue. By default, newly arriving cells will be discarded until the service class threshold is no longer exceeded. At 312, the controller determines whether the memory used to provide the queues is full (or near full). If this is the case, cells are discarded at 304 after optionally applying a fairness algorithm at 310 to determine how many cells are discarded from each queue. By default, newly arriving cells will be discarded until the memory is no longer full.

Figure 6:
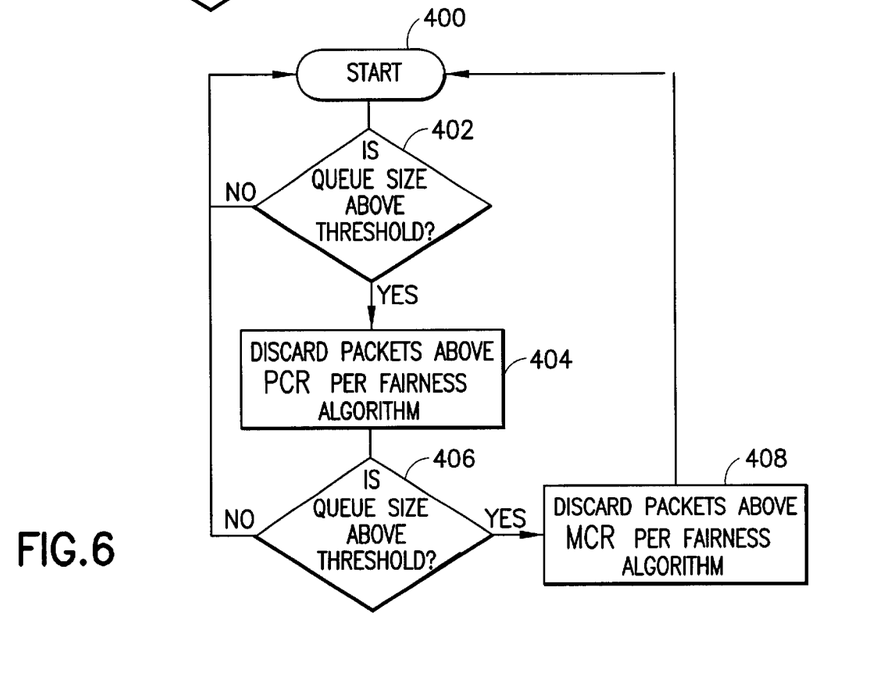
FIG. 6 is a simplified flow chart illustrating the packet discard policy of the line side outlet queue packet processor according to the invention.

Turning now to FIG. 6, GFR cells are also discarded at the line side outlet if congestion is indicated. In particular, starting at 400, the line side outlet batch processing queue (154 in FIG. 3) is examined by the post queue packet processor (156 in FIG. 3). If it is determined at 402 that the number of cells in the queue exceed a preset threshold, packets above the PCR are discarded. If it is determined at 406 that the queue size remains above the threshold after discarding packets above the PCR, the controller will, at 408 discard packets above MCR. The processor knows which VC each cell belongs to and fairness is automatic because each VC has its own PCR and its own MCR.

There have been described and illustrated herein several embodiments of methods and apparatus for managing traffic in an ATM network. While particular embodiments of the invention have been described, it is not intended that the invention be limited thereto, as it is intended that the invention be as broad in scope as the art will allow and that the specification be read likewise. Thus, while particular method steps have been disclosed as being performed in a particular order, it will be appreciated that some of the method steps need not be performed in the order recited. Also, while a particular number of queues have been shown, it will be recognized that other numbers of queues could be used with similar results obtained. Moreover, while particular configurations have been disclosed in reference to the coupling of queues, multiplexers, monitors, controllers, and processors, it will be appreciated that other configurations could be used as well. In particular, as mentioned above the apparatus of the invention may be realized in hardware, software, or a combination of hardware and software. It will therefore be appreciated by those skilled in the art that yet other modifications could be made to the provided invention without deviating from its spirit and scope as so claimed.

What is claimed is:

1. A user-network interface apparatus for managing traffic in an ATM network, comprising:

a) a line side inlet which receives ATM cells from a plurality of user subscriber lines;

b) a network side outlet which provides ATM cells from the subscriber lines to the ATM network;

c) a network side inlet which receives ATM cells from the ATM network;

d) a line side outlet which provides ATM cells from the ATM network to the subscriber lines;

e) at least one line side inlet queue which buffers ATM cells received from the user subscriber lines;

f) at least one network side outlet queue coupled to said line side inlet queue which buffers ATM cells received from said line side inlet queue;

g) a network side outlet queue monitor coupled to said network side outlet queue for monitoring the state of said network side outlet queue;

h) a line side inlet queue controller coupled to said line side inlet queue for controlling the release of cells from said line side inlet queue, said line side inlet queue controller being coupled to said network side outlet queue monitor, wherein said network side outlet queue monitor sends messages to said line side inlet queue controller based on the state of said network side outlet queue, and said line side inlet queue controller causes cells to be moved from said line side inlet queue to said network side outlet queue in response to messages from said network side outlet queue monitor.

2. The apparatus according to claim 1, wherein:

said at least one line side inlet queue includes a plurality of line side inlet queues, one for each guaranteed frame rate virtual connection GFR VC.

3. The apparatus according to claim 1, wherein:

said network side outlet queue monitor means sends periodic messages to said line side inlet queue controller means based on a preselected time parameter (T) regardless of the state of said network side outlet queue.

4. The apparatus according to claim 2, wherein:

said network side outlet queue monitor sends periodic messages to said line side inlet queue controller based on a preselected time parameter T regardless of the state of said network side outlet queue, said periodic messages directing said line side inlet queue controller to move cells from each of said line side inlet queues at the minimum cell rate MCR for each Guaranteed frame rate GFR VC.

5. The apparatus according to claim 3, wherein:

said network side outlet queue monitor means increases the frequency of said periodic messages to said line side inlet queue controller means when the number of cells in said network side outlet queue drops below a threshold.

6. The apparatus according to claim 4, wherein:

said network side outlet queue monitor means increases the frequency of said periodic messages to said line side inlet queue controller means when the number of cells in said network side outlet queue drops below a threshold value equal to the sum of the products T*MCR for each of the GFR VCs.

7. The apparatus according to claim 4, wherein:

when the number of cells in said network side outlet queue drops below a threshold, said network side outlet queue monitor means sends a message to said line side inlet queue controller means to move a preselected M number of cells from each of said line side inlet queues.

8. The apparatus according to claim 7, wherein:

M is a different number for each GFR VC.

9. The apparatus according to claim 1, wherein:

said line side inlet queue controller means discards cells from said line side inlet queue when said line side inlet queue is in a congestion condition.

10. The apparatus according to claim 2, wherein:

said line side inlet queue controller means discards cells from said line side inlet queues when a congestion condition is indicated.

11. The apparatus according to claim 10, wherein:

each GFR VC has a peak cell rate PCR, said congestion condition is indicated when one of said line side inlet queues receives cells at a rate in excess of the PCR for the GFR VC.

12. The apparatus according to claim 10, wherein:

said congestion condition is indicated when one of said line side inlet queues contains a number of cells above a preselected threshold number.

13. The apparatus according to claim 10, wherein:

said congestion condition is indicated when a total number of cells in all of said line side inlet queues is above a preselected threshold number.

14. The apparatus according to claim 10, wherein:

said line side inlet queues are implemented in a shared memory and said congestion condition is indicated when said shared memory is near full.

15. The apparatus according to claim 1, further comprising:

i) a first line side outlet queue coupled to said network side inlet which buffers cells received from the ATM network; and j) a first line side outlet queue processor means coupled to said first line side outlet queue for discarding cells from said first line side outlet queue when a congestion condition is indicated.

16. The apparatus according to claim 15, wherein:

said congestion condition is indicated when the number of cells in said first line side outlet queue exceeds a predetermined threshold.

17. The apparatus according to claim 16, further comprising:

k) a demultiplexer for distinguishing guaranteed frame rate GFR cells from all other cells, said demultiplexer being coupled between said first line side outlet queue and said network side inlet, wherein:

each GFR VC has a peak cell rate PCR, only GFR cells enter said first line side outlet queue, and when said congestion condition is indicated, and cells in excess of the PCR for each GFR are discarded by said first line side outlet queue processor.

18. An apparatus according to claim 17, wherein:

each GFR VC has a minimum cell rate MCR and said first line side outlet queue processor means discards cells in excess of the MCR for each GFR if discarding cells above the PCR for each GFR fails to eliminate congestion.

\* \* \* \* \*